United States Patent
Wong et al.

[11] Patent Number: 5,940,442
[45] Date of Patent: Aug. 17, 1999

[54] HIGH SPEED DATA RECEIVER

[75] Inventors: Hee Wong, San Jose; Abhijit Phanse, Santa Clara, both of Calif.

[73] Assignee: National Semiconductor Corporation, Santa Clara, Calif.

[21] Appl. No.: 08/791,381

[22] Filed: Jan. 30, 1997

[51] Int. Cl.⁶ .............................. H03H 7/30; H04L 27/06
[52] U.S. Cl. ........................ 375/232; 375/316; 375/317
[58] Field of Search .................................. 375/229, 232, 375/317, 355, 316; 327/95, 73; 333/18, 28 R; 364/724.19, 724.2

[56] References Cited

U.S. PATENT DOCUMENTS

| | | | |
|---|---|---|---|
| 4,253,184 | 2/1981 | Gitlin et al. | 375/232 |
| 4,361,892 | 11/1982 | Martin | 375/14 |
| 4,602,374 | 7/1986 | Nakamura et al. | 375/317 |
| 4,641,324 | 2/1987 | Karsh et al. | 375/317 |
| 4,707,840 | 11/1987 | Nakayama | 375/232 |
| 5,065,410 | 11/1991 | Yoshida et al. | 375/317 |
| 5,438,593 | 8/1995 | Karam et al. | 375/317 |
| 5,450,457 | 9/1995 | Ito et al. | 375/355 |
| 5,563,911 | 10/1996 | Uesugi et al. | 375/232 |
| 5,764,695 | 6/1998 | Nagaraj et al. | 375/232 |
| 5,764,703 | 6/1998 | Charvin et al. | 375/317 |

FOREIGN PATENT DOCUMENTS

0 656 694 A2  6/1995  European Pat. Off. .......... H04B 3/14

*Primary Examiner*—Tesfaldet Bocure
*Attorney, Agent, or Firm*—Limbach & Limbach L.L.P.

[57] ABSTRACT

A high speed data receiver for recovering binary or MLT3 encoded data which has been received via a cable. An adaptive equalizer provides signal gain which increases with frequency and adapts according to the length of the cable. Control over such adaptive equalizing is achieved by monitoring the peak-to-peak amplitude, amplitude peaks and differences between amplitude peaks of the equalized data signal during defined time intervals. Baseline restoration and dynamic data slicing are also provided.

36 Claims, 4 Drawing Sheets

HIGH SPEED DATA RECEIVER

BACKGROUND OF THE INVENTION

1. Field of the Invention

The present invention relates to data receivers for receiving high data rate signals from long lengths of cable, and in particular, data receivers for receiving high data rate, baseband, binary or MLT3 encoded data signals from long lengths of cable, while providing adaptive equalization, dynamic data slicing and signal baseline restoration.

2. Description of the Related Art

Recovering data which has been transmitted over a long length of cable at high rates requires that such data be equalized in order to compensate for the loss and phase dispersion of the cable. Further, in those applications where the cable length may vary, such equalization must be based upon a complementary transfer function which is capable of adapting accordingly since the transfer function of the cable varies with the length of the cable. This equalizing is generally done using three functions: a filter function; a dc restoration and slicing function; and an adaptation control, or servo, function.

The filter function is performed using a complementary (with respect to the complex cable loss characteristic) filter which synthesizes the inverse of the transfer function of the cable. Since the bit error rate (BER) is directly related to jitter, an important performance metric for an equalizer is jitter within the output waveform. The extent to which the equalizer is able to match the inverse of the complex cable loss characteristic determines the extent to which inter-symbol interference induced jitter is eliminated.

As for the dc restoration and slicing function, it is well known that ac coupling a digital data stream with variations in pattern density creates baseline wander. If the waveform has finite rise times, then the baseline wander will cause jitter which results in slicing of the data at different amplitude points along the waveform edges, and the finite rise and fall times of such edges translate the amplitude slicing variations to timing variations. One conventional technique for eliminating baseline wander is to use a quantized feedback circuit in which positive feedback around the comparator is used so that very little charging current flows through the input ac coupling capacitor. In other words, the comparator provides its own dc restoration. However, there is a start-up problem associated with the use of quantized feedback. For example, if the comparator starts out in a state opposite that of the input state, then the output may never transition between states at all because the ac coupled input never crosses the comparator threshold. This situation is aggravated by sparse data patterns.

As for the adaptation control, or servo, function, conventional adaptive equalizers use a simple peak detection technique in which a control voltage is produced which is always proportional to the pulse height of the equalized data signal. However, such a peak detection servo is very sensitive to amplitude errors in the incoming data signal.

SUMMARY OF THE INVENTION

A high speed data receiver in accordance with one embodiment of the present invention includes an adaptive signal equalizer, a signal sampler and an equalizer controller. The adaptive signal equalizer is configured to receive an equalizer control signal and in accordance therewith receive and adaptively equalize an input data signal from a cable and in accordance therewith provide an equalized data signal which corresponds to the input data signal. The signal sampler is coupled to the adaptive signal equalizer and is configured to receive a plurality of sampling control signals and in accordance therewith receive and sample the equalized data signal and in accordance therewith provide a plurality of data sample signals. One data sample signal represents a peak-to-peak amplitude of the equalized data signal, while another data sample signal represents a sum of differences between pluralities of positive and negative amplitude peaks of the equalized data signal. The equalizer controller is coupled to the signal sampler and the adaptive signal equalizer and is configured to receive and process the aforementioned data sample signals and a plurality of reference signals and in accordance therewith provide the equalizer control signal.

A high speed data receiver in accordance with another embodiment of the present invention includes a signal sampler, a signal slicer and a sampler controller. The signal sampler is configured to receive a plurality of sampling control signals and in accordance therewith receive and sample an input data signal and in accordance therewith provide a plurality of data sample signals. One data sample signal represents a weighted average of a plurality of positive amplitude peaks of the input data signal, while another data sample signal represents a weighted average of a plurality of negative amplitude peaks of the input data signal. The signal slicer is coupled to the signal sampler and is configured to receive the input data signal and in accordance therewith receive and slice the aforementioned data sample signals and in accordance therewith provide a plurality of data slice signals. One data slice signal corresponds to a first weighted difference between the sliced data sample signals, while another data slice signal corresponds to a second weighted difference between the sliced data sample signals. The sampler controller is coupled to the signal slicer and the signal sampler and is configured to receive and process the aforementioned data slice signals and in accordance therewith provide the plurality of sampling control signals.

A high speed data receiver in accordance with still another embodiment of the present invention includes a baseline corrector and a signal sampler. The baseline corrector is configured to receive an input data signal having a data signal baseline associated therewith, a data sample feedback signal and a baseline reference signal and in accordance therewith establish and maintain the data signal baseline. The signal sampler is coupled to the baseline corrector and is configured to receive a plurality of sampling control signals and in accordance therewith receive and sample the input data signal with the established and maintained data signal baseline and in accordance therewith provide a plurality of data sample signals which includes the data sample feedback signal. The data sample feedback signal represents a summation of weighted averages of pluralities of positive amplitude peaks and negative amplitude peaks of the data signal.

These and other features and advantages of the present invention will be understood upon consideration of the following detailed description of the invention and the accompanying drawings.

DETAILED DESCRIPTION OF THE INVENTION

Figure 1:
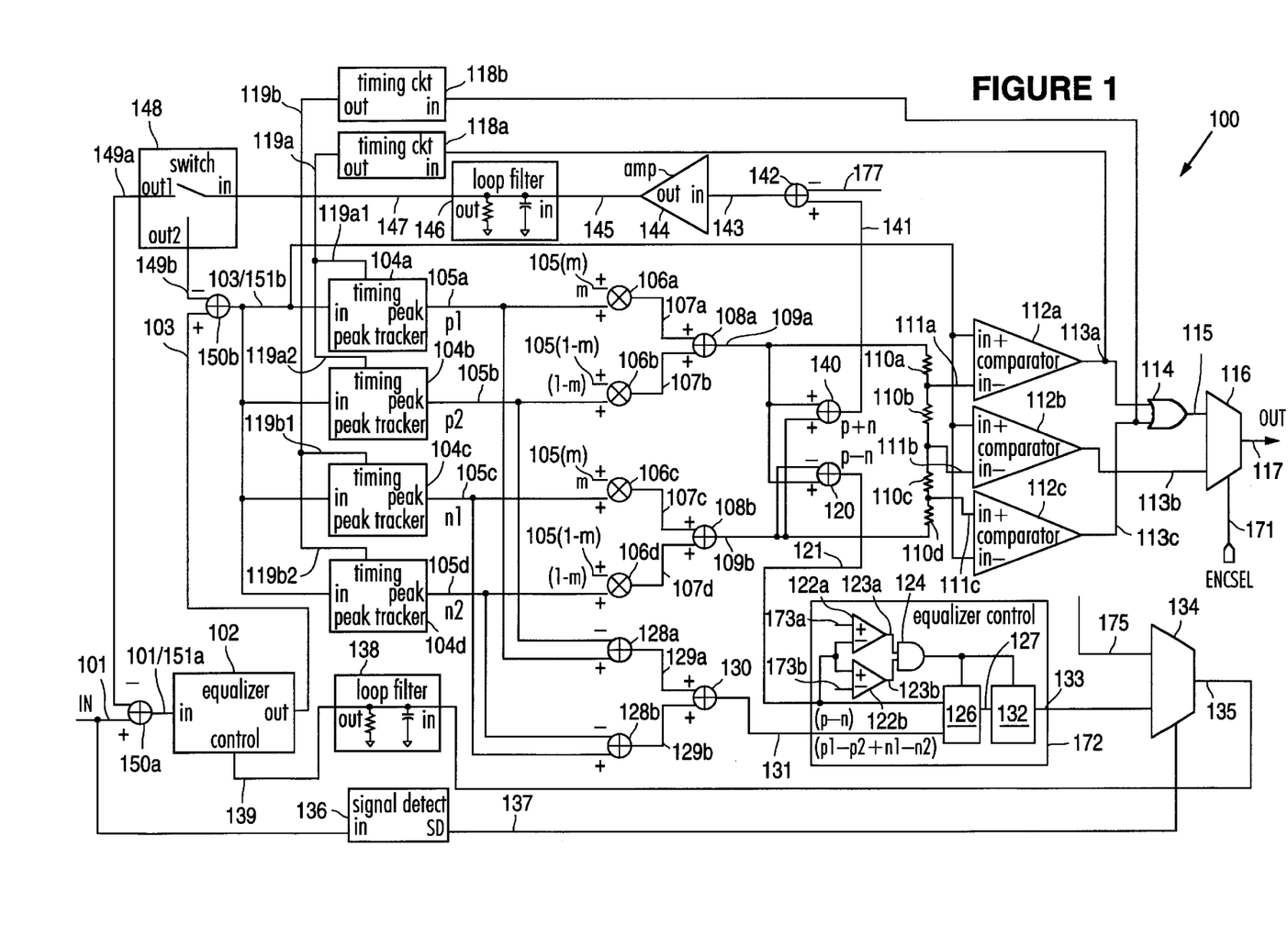
FIG. 1 is a functional block diagram of a high speed data receiver in accordance with one embodiment of the present invention.

Referring to FIG. 1, a high speed data receiver 100 in accordance with one embodiment of the present invention provides an architecture for receiving either binary or MLT3 encoded data which has been received via a cable, e.g., fast Ethernet. As discussed in more detail below, such a data receiver 100 provides adaptive equalization, dynamic data slicing and signal baseline restoration as well.

The incoming data signal 101, which has been received via a long cable of variable length, is coupled into the adaptive equalizer 102 where it is amplified with a signal gain which increases with frequency in accordance with an equalizer control signal 139 (discussed in more detail below). The equalized data signal 103/151b is coupled into four peak trackers 104a, 104b, 104c, 104d. (The purposes of the signal adders 150a, 150b at the input and output of the equalizer 102 are discussed below.) As discussed in more detail below, each peak tracker 104 samples the equalized data signal 103/151b by capturing its peak amplitude within a predetermined time period, or window. The particular time period within each peak tracker 104a, 104b, 104c, 104d is defined by two sets of timing signals 119a, 119b from two timing circuits 118a, 118b (discussed in more detail below).

The resulting peak sample signals 105a, 105b, 105c, 105d from the peak trackers 104a, 104b, 104c, 104d are received and multiplied by two multiplier signals 105(m), 105(1−m) within respective signal multipliers 106a, 106b, 106c, 106d. The peak sample signals 105a, 105b from the first two peak trackers 104a, 104b represent the positive amplitude peaks p1, p2 of the equalized data signal 103/151b in two different time windows, while the peak sample signals 105c, 105d from the remaining two peak trackers 104c, 104d represent the negative amplitude peaks n1, n2. The resulting "positive" peak sample product signals m·p1 107a, (1−m)·p2 107b and "negative" peak sample product signals m·n1 107c, (1−m)·n2 107d are summed in respective signal adders 108a, 108b to produce "positive" p 109a and "negative" n 109b data sample signals which are weighted averages of the "positive" 105a, 105b and "negative" 105c, 105d peak sample signals.

The foregoing description can be expressed mathematically as follows:

$$p = m \cdot p1 + (1 - m) \cdot p2 \quad (1)$$

$$n = m \cdot n1 + (1 - m) \cdot n2 \quad (2)$$

From equations (1) and (2) it can be seen that when m=1, p=p1 and n=n1, and when m=0, p=p2 and n=n2. Hence, when m has a value between 0 and 1, p and n are weighted averages of p1 and p2 and of n1 and n2, respectively. The value of m can be dynamically set during circuit operation and can be based upon the statistical nature of the incoming data, and can also be used to optimize the tracking capability of the receiver with or without signal baseline wander.

The data sample signals p 109a, n 109b are applied across a resistive voltage divider consisting of four serially connected resistors 110a, 110b, 110c, 110d having equal values R of resistance. The resulting voltages 111a, 111b, 111c are compared with the equalized data signal 103/151b by voltage comparators 112a, 112b, 112c to produce "positive slice" 113a, "middle slice" 113b and "negative slice" 113c signals having signal values in accordance with the following:

$$MidSlice = n + \frac{(p - n)}{2} \quad (3)$$

$$PosSlice = n + \frac{3 \cdot (p - n)}{4} \quad (4)$$

$$NegSlice = n + \frac{(p - n)}{4} \quad (5)$$

The positive 113a and negative 113c slice signals are summed, i.e., logically ORed, in an OR gate 114, with the result 115 going to an output signal selector (e.g., multiplexor) 116. The output signal selector 116 also receives the middle slice signal 113b.

The output signal selector 116 is controlled by an encoding selector signal ENCSEL 171 which selects the mode of operation of the data receiver 100. In the binary mode, ENCSEL=1 and the data sliced by the middle slice level comparator 112b, i.e., the middle slice signal 113b, is used as the output 117. In the MLT3 mode, ENCSEL=0 and the sum (OR) 115 of the data sliced by the positive 112a and negative 112c level comparators is used as the output signal 117.

The positive 113a and negative 113c slice signals are also used by the timing circuits 118a, 118b to generate the timing control signals 119a, 119b which define the start and end points of each data pulse. The timing circuits 118a, 118b use these data slice signals 113a, 113c in clocked state machines to create the time windows during which the peak trackers 104a, 104b, 104c, 104d are active (discussed in more detail below).

The positive 109a and negative 109b data sample signals are also differentially summed (i.e., subtracted) in a signal adder 120. The resulting signal 121 has a value of (p−n) and represents the peak-to-peak amplitude of the equalized data signal 103/151b. The positive peak sample signals 105a, 105b are also differentially summed in a signal adder 128a, as are the negative peak sample signals 105c, 105d differentially summed in another signal adder 128b. The resulting difference signals 129a, 129b are themselves then summed in another signal adder 130 to produce a peak difference sample signal 131 which represents (p1−p2+n1−n2), i.e., the sum of the differences between the positive amplitude peaks and negative amplitude peaks of the equalized data signal 103/151b.

The peak-to-peak data sample signal 121 is compared against two reference signals 173a, 173b with two voltage comparators 122a, 122b. The first reference voltage 173a is set equal to the amplitude Veq of the transmitted signal (without any attenuation) minus a predetermined voltage difference dV, i.e., Veq−dV, while the second reference voltage 173b is equal to Veq+dV. (The value of dV is not critical to the performance of the receiver 100; e.g., if Veq=1.0 volt, dV could be 0.2 volt.) The comparator outputs 123a, 123b are logically ANDed in an AND gate 124 to produce a control signal 125 for a multiplexor 126 and logic block 132. When the value of the peak-to-peak data sample signal 121 (p−n) is less than (Veq−dV) or greater than (Veq+dV), the equalizer controller 172 is in the acquisition mode and the control signal 125 is a logic 0. When the value of the peak-to-peak data sample signal 121 (p−n) is greater than (Veq−dV) and less than (Veq+dV), the equalizer controller 172 is in the fine control mode and the control signal 125 is a logic 1. When the control signal 125 is a logic 0, the multiplexor 126 selects the peak-to-peak data sample signal 121 as the signal 127 for processing by the logic block 132. When the control signal 125 is a logic 1, the multiplexor 126 selects the peak difference sample signal 131 as the signal 127 for processing by the logic block 132.

Accordingly, in the acquisition mode, when the equalized data signal 103/151b is less than Veq, the adaptive equalization is increased and, conversely, when the equalized data signal 103/151b is greater than Veq, the adaptive equalization is decreased. Therefore, in the acquisition mode, the input signal 103/151b is brought to within dV of Veq. On the other hand, in the fine control mode, when (p1−p2+n1−n2) is negative, the adaptive equalization is increased and, conversely, when (p1−p2+n1−n2) is positive, the adaptive equalization is decreased. Therefore, in the fine control mode, the equalization feedback loop converges when p1 becomes equal to p2 and n1 becomes equal to n2. This corresponds to the state in which the equalized data signal 103/151b has been restored to a square pulse and has, therefore, been correctly equalized. Hence, these two modes of the equalizer controller 172 guarantee convergence of the adaptive equalization feedback loop.

The output 133 from the logic block 132 of the equalizer controller 172 is one of two inputs to a signal selector (e.g., multiplexor) 134. The other input is a default equalizer control voltage 175. A signal detector 136 monitors the incoming data signal 101 and, when data is present, produces an active data detection signal 137 which controls the signal selector 134. Hence, when there is a data signal on the cable, the data detection signal 137 is a logic 1 and the signal selector 134 selects the equalizer controller output 133 and, conversely, when there is no data signal on the cable, the data detection signal 137 is a logic 0 and the signal selector 134 selects the default equalizer control voltage 175. The signal selector output 135 is filtered by a loop filter 138 to produce the actual control voltage 139 for the equalizer 102.

A baseline data sample signal (p+n) 141 is produced by summing the data sample signals 109a, 109b in a signal adder 140. This baseline data sample signal 141 is differentially summed in a signal adder 142 with a baseline wander reference voltage 177. (This baseline wander reference signal 177 is set equal to the baseline data sample signal 141 during the initial training period of the data receiver 100 when there is no baseline wander in the input data signal 101.) The resulting sum signal 143 is buffered by a buffer amplifier 144, and the buffered signal 145 is filtered by a loop filter 146. This buffered and filtered signal 147 represents the baseline wander of the input data signal 101 and is selectively summed differentially with either the incoming data signal 101 or the equalized data signal 103. This selection is made with a switch 148 (which, alternatively, can be a mask option when fabricating the data receiver 100 in integrated form). Accordingly, a baseline wander control signal 149a can be differentially summed with the incoming data signal 101 in a signal adder 150a prior to the equalization by the equalizer 102, or a baseline wander control signal 149b can be differentially summed with the equalized data signal 103 in a signal adder 150b prior to the peak tracking by the peak trackers 104a, 104b, 104c, 104d. This differential summing of the baseline wander control signal 149a/149b with the input data signal 101 or equalized data signal 103 serves to restore the baseline of the data signal 103/151b used by the peak trackers 104a, 104b, 104c, 104d and data slice comparators 112a, 112b, 112c.

Figure 2:
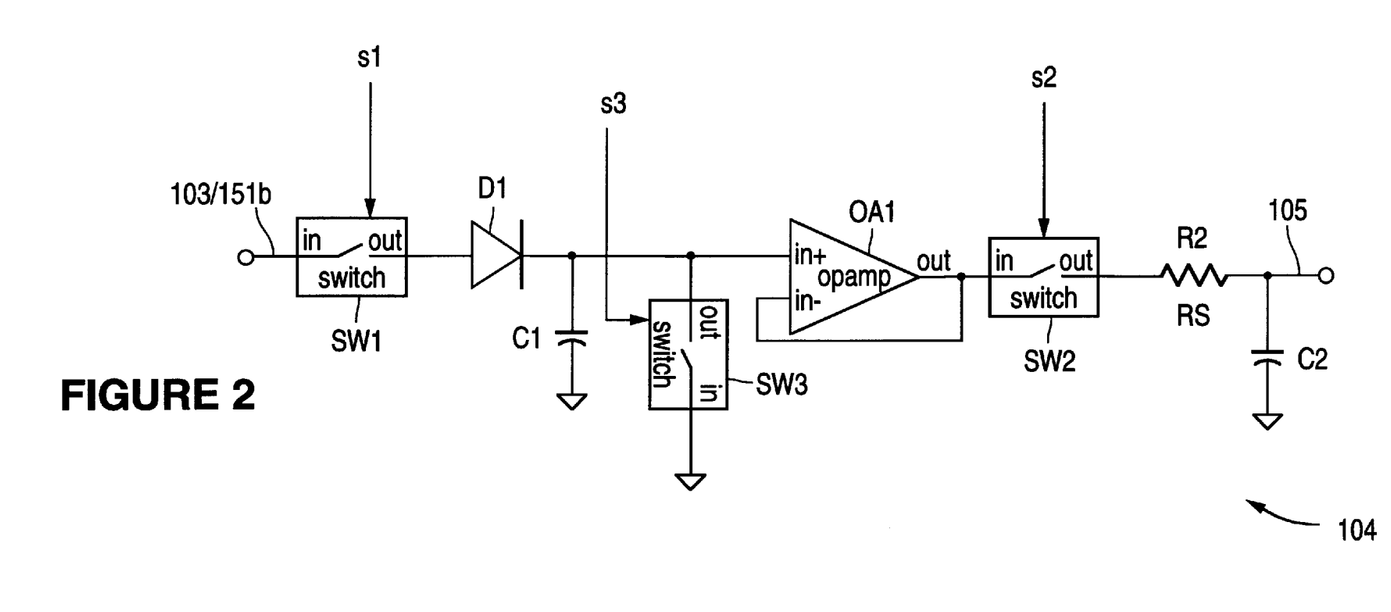
FIG. 2 is a functional block and schematic diagram of a peak tracker circuit for use in the data receiver of FIG. 1.
Figure 3:
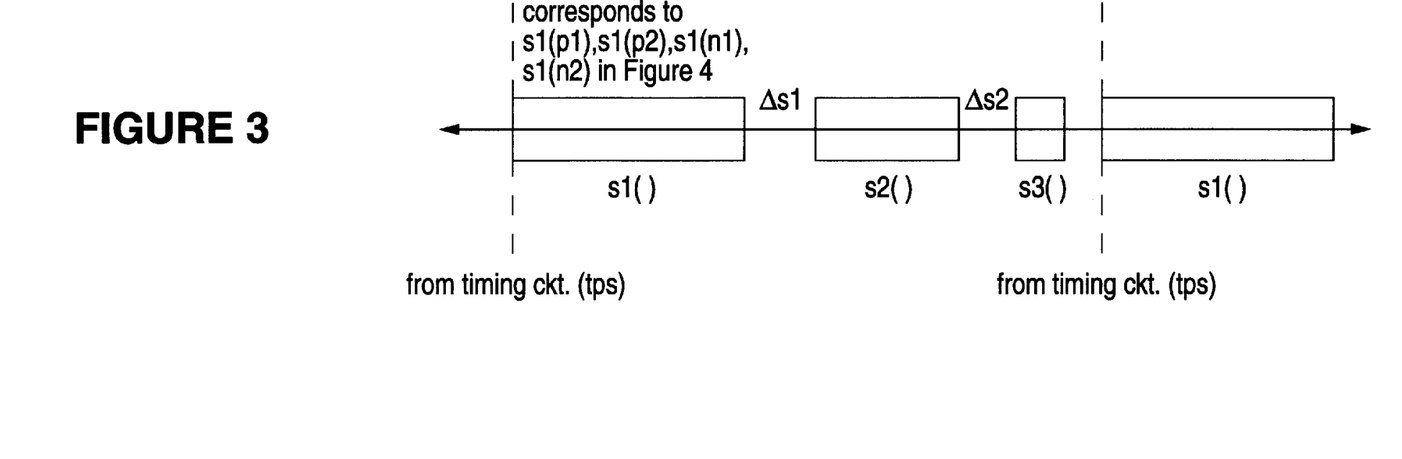
FIG. 3 represents the relative timing for the switch control signals in the peak tracker of FIG. 2.

Referring to FIGS. 2 and 3, each of the peak trackers 104 used in the data receiver 100 of FIG. 1 includes three switches SW1, SW2, SW3, an operational amplifier OA1, a diode D1, two capacitors C1, C2 and a resistor R2, interconnected as shown. Capacitor C1 is initially discharged via switch SW3 which is controlled by switch control signal s3. During time window $s1_0$, capacitor C1 charges to the peak value of the equalized data signal 103/151b. During time window $s2_0$, the voltage on capacitor C1 is transferred to capacitor C2 via switch SW2 which is controlled by switch control signal s2. During time window $s3_0$, capacitor C1 is discharged via switch SW3 which is controlled by switch control signal s3, thereby making capacitor C1 ready to again charge up to the peak value of the data signal 103/151b during the next occurrence of time window $s1_0$. Hence, the output voltage 105 across capacitor C2 represents the peak value of the data signal 103/151b during time window $s1_0$ and will track the increase and decrease of the peak value of the data signal 103/151b at the same rate, i.e., in accordance with the R2·C2 time constant. The start of time window $s1_0$ is determined by the timing circuit blocks 118a, 118b (FIG. 1), with the exact values of the time windows $s1_0$, $s2_0$, $s3_0$ and the time gaps between them Δs1, Δs2 depending upon the implementation.

Figure 4A:
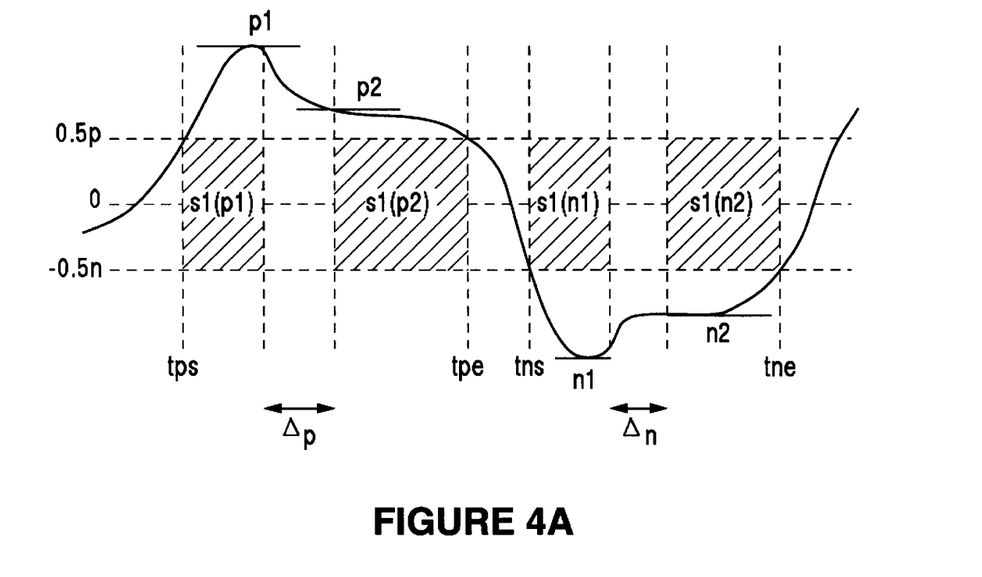
FIGS. 4A and 4B, for over-equalized and under-equalized inputs, respectively, illustrate the peak tracking function performed by the peak tracker of FIG. 2 during the timing periods of FIG. 3.
Figure 4B:
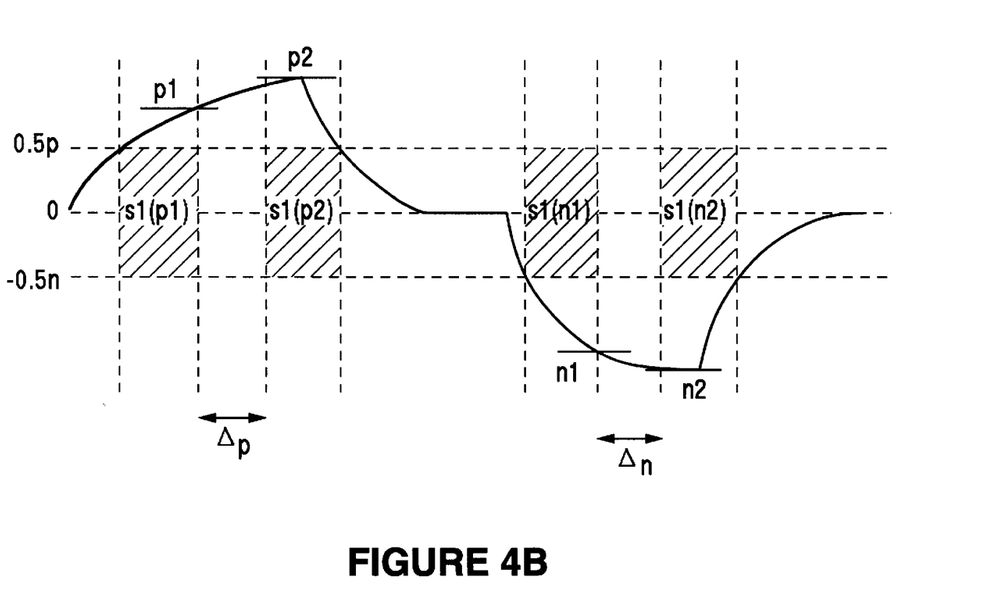

Referring to FIGS. 4A and 4B along with FIG. 3, the time window $s1_0$ in FIG. 3 corresponds to time windows s1(p1), s1(p2), s1(n1) and s1(n2) which are set by the timing circuits 118a, 118b (FIG. 1). Time windows $s2_0$ and $s3_0$ are set by the peak trackers 104a, 104b, 104c, 104d. (Time windows $s2_0$ and $s3_0$ are not shown in FIGS. 4A and 4B.)

The timing circuits 118a, 118b create time windows for controlling the active periods s1(p1), s1(p2), s1(n1), s1(n2) of the peak trackers 104a, 104b, 104c, 104d. The start points tps, tns and end points tpe, tne in time are determined from signals Vp (data slice signal 113a provided by the positive slice comparator 112a) and Vn (data slice signal 113c provided by the negative slice comparator 112c). Time windows s1(p1), s1(p2), s1(n1), s1(n2), Δp and Δn are established by a clocked state machine. Time tps corresponds to the rising edge of signal Vp, time tpe corresponds to the falling edge of signal Vp, time tns corresponds to the rising edge of signal Vn and time tne corresponds to the falling edge of signal Vn.

The design parameters for a Fast Ethernet (125 Mbps) data receiver in accordance with one embodiment of the present invention are as follows:

| | |
|---|---|
| Time window s1(p1): | 8–12 ns<br>s1(p1) starts at tps (when the equalized signal is 50% of the positive peak, p)<br>time window s1(p1) (8–12 ns) is set using a clocked state machine |
| Time window s1(n1): | 8–12 ns<br>s1(n1) starts at tns (when the equalized signal is 50% of the negative peak, n)<br>time window s1(n1) (8–12 ns) is set using a clocked state machine |
| Time window Δp: | 4 ns<br>Δp stars at the end of s1(p1) |

-continued

| | time window Δp (4 ns) is set using the clocked state machine |
|---|---|
| Time window Δn: | 4 ns |
| | Δn starts at the end of s1(n1) |
| | time window Δn (4 ns) is set using the clocked state machine |

Time window s1(p2) starts at the end of Δp and ends at the time tpe (50% of positive peak p). If time window s1(p2) is greater or equal to 16 ns, then the peak captured by the peak tracker during s1(p2) is considered to be peak p2. If time window s1(p2) is less than 16 ns, then the peak captured during s1(p2) is discarded (i.e., peak p2 remains unchanged from its previous value).

Time window s1(n2) starts at the end of Δn and ends at time tme (50% of negative peak n). If time window s1(n2) is greater or equal to 16 ns, then the peak captured by the peak tracker during s1(n2) is considered to be peak n2. If time window s1(n2) is less than 16 ns, then the peak captured during s1(n2) is discarded (i.e., peak n2 remains unchanged from its previous value).

From the foregoing discussion it can be seen that by obtaining multiple samples of both positive and negative signal excursions (e.g., positive signal peaks p1 and p2 separated by time window Δp, and negative signal peaks n1 and n2 separated by time window Δn) information about the waveshape (i.e., amplitude versus time) of the input data signal is obtained. It should be understood that other multiple sampling techniques can also be used whereby virtually any other combination of various positive and/or and negative signal peaks are used to determine, to some degree of approximation, the amplitude versus time characteristics of the input data signal.

Figure 5:
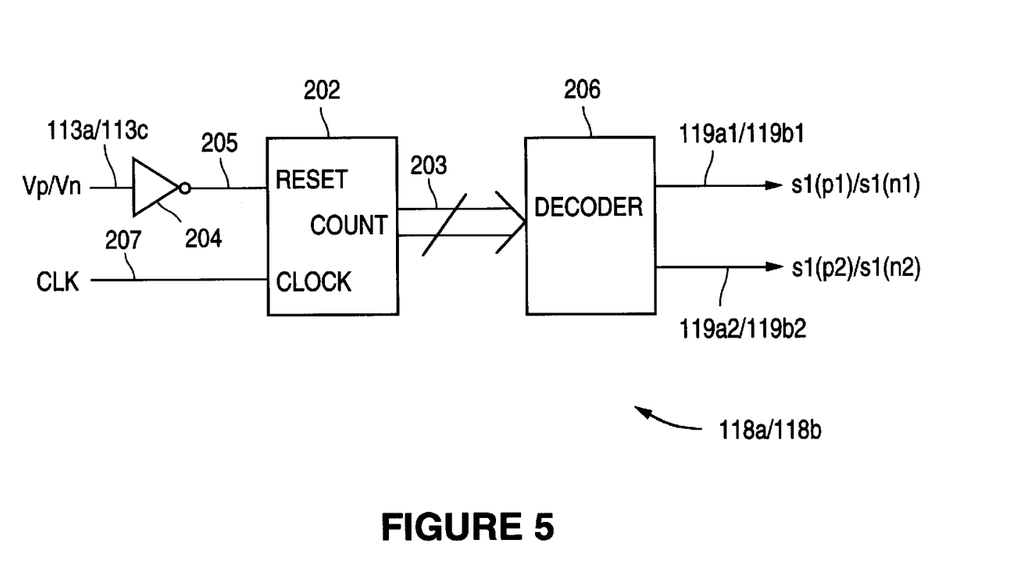
FIG. 5 is a functional block diagram of the timing circuit in the data receiver of FIG. 1.

Referring to FIG. 5, the timing circuits 118 in the data receiver 100 of FIG. 1 can be implemented with a counter 202, inverter 204 and decoder 206 as shown. The positive/negative slice signals 113a/113c are inverted by the inverter 204, with the inverted slice signal 205 being used as the reset signal for the counter 202. The counter 202 is clocked by an externally generated clock signal 207. The multibit count output 203 is decoded by the decoder 206 to produce the timing control signals 119a1, 119a 2, 119b1, 119b2 for the individual peak trackers 104a, 104b, 104c, 104d.

Figure 6:
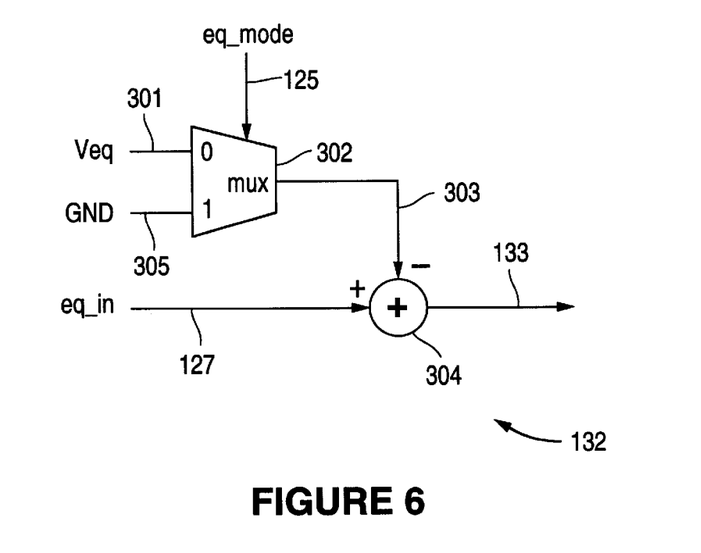
FIG. 6 is a functional block diagram of the logic block in the data receiver of FIG. 1.

Referring to FIG. 6, the logic block 132 in the equalizer controller 172 in the data receiver 100 of FIG. 1 can be implemented with a multiplexor 302 and signal summer 304 as shown. The multiplexor 302, in accordance with the control signal 125 generated by the AND gate 124 (FIG. 1), selects either a reference voltage 301 equal to the amplitude Veq of the transmitted signal or another reference voltage 305 established at circuit ground. The resulting multiplexor output signal 303 is differentially summed with (i.e., subtracted from) the signal 127 generated by multiplexor 126 (FIG. 1). The result forms the equalizer control output 133.

Based upon the foregoing, it can be seen that at least three control "loops" are used in the data receiver 100 of FIG. 1. One loop provides for control of the adaptive signal equalization by using the peak-to-peak data sample signal 121 and peak difference sample signal 131 to produce the equalizer control signal 139. Another loop provides for control of the signal sampling by using the positive 113a and negative 113c slice signals, generated in accordance with the input signal 103/151b and positive 109a and negative 109b data sample signals, to produce the timing control signals 119a, 119b. Yet another loop provides for control of the baseline wander of the input data signal 101 by using the baseline data sample signal 141 to generate baseline wander control signals 149a, 149b.

Based further upon the foregoing, it can be seen that by using dual positive and negative signal peak trackers, multiple positive and negative signal peak samples are obtained, thereby providing data sample signals 105a, 105b, 105c, 105d which, when appropriately processed (e.g., multiplied and summed as discussed above), provide a number of data sample signals containing amplitude, frequency and signal waveshape information useful for generating control signals necessary for controlling equalization and sampling of the input signal, as well as correction of the input signal baseline wander.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a high speed data receiver comprising:

an adaptive signal equalizer configured to receive an equalizer control signal and in accordance therewith receive and adaptively equalize an input data signal from a cable and in accordance therewith provide an equalized data signal which corresponds to said input data signal;

a signal sampler, coupled to said adaptive signal equalizer, configured to receive a plurality of sampling control signals and in accordance therewith receive and sample said equalized data signal and in accordance therewith provide at least one of a plurality of data sample signals, wherein said plurality of data sample signals includes a first data sample signal which represents a peak-to-peak amplitude of said equalized data signal and further includes a second data sample signal which represents a magnitude versus time characteristic of said equalized data signal; and an equalizer controller, coupled to said signal sampler and said adaptive signal equalizer, configured to receive and process said at least one of a plurality of data sample signals and in accordance therewith provide said equalizer control signal.

2. The apparatus of claim 1, wherein said adaptive signal equalizer comprises an amplifier with a signal gain which increases with signal frequency.

3. The apparatus of claim 1, wherein said signal sampler comprises:

a plurality of signal peak trackers configured to receive said plurality of sampling control signals and said equalized data signal and in accordance therewith provide a plurality of peak sample signals, wherein each one of said plurality of peak sample signals represents an amplitude peak of said equalized data signal during a time interval defined by a corresponding one of said plurality of sampling control signals; and a plurality of signal combiners, coupled to said plurality of signal peak trackers, configured to receive and selectively multiply and sum said plurality of peak sample signals and in accordance therewith provide said at least one of a plurality of data sample signals.

4. The apparatus of claim 1, wherein said second data sample signal represents a sum of a difference between positive amplitude peaks and a difference between negative amplitude peaks of said equalized data signal.

5. The apparatus of claim 1, wherein:
said at least one of a plurality of data sample signals comprises said first and second data sample signals; and
said equalizer controller comprises:
a signal comparison circuit configured to receive and compare said first data sample signal and a plurality of comparison reference signals and in accordance therewith provide a comparison result signal which indicates whether said first data sample signal has an amplitude which is greater than one of said plurality of comparison reference signals and less than another one of said plurality of comparison reference signals; and
a signal selector and processor, coupled to said signal comparison circuit, configured to receive said comparison result signal and in accordance therewith receive and select between and process said first and second data sample signals and in accordance therewith provide said equalizer control signal.

6. The apparatus of claim 1, wherein said equalizer controller comprises:
a signal processing circuit configured to process said at least one of a plurality of data sample signals and in accordance therewith provide a data present control signal;
a signal selector, coupled to said signal processing circuit, configured to receive an input detection signal and in accordance therewith receive and select between said data present control signal and a data absent control signal and in accordance therewith provide said equalizer control signal; and
a signal detector, coupled to said signal selector, configured to detect said input data signal and in accordance therewith provide said input detection signal.

7. The apparatus of claim 1, further comprising:
a signal slicer, coupled to said signal sampler, configured to receive said equalized data signal and in accordance therewith receive and slice a portion of said plurality of data sample signals and in accordance therewith provide a plurality of data slice signals which includes a first data slice signal corresponding to a first weighted difference between individual ones of said portion of said plurality of data sample signals and further includes a second data slice signal corresponding to a second weighted difference between said individual ones of said portion of said plurality of data sample signals; and
a sampler controller, coupled to said signal slicer and said signal sampler, configured to receive and process said first and second data slice signals and in accordance therewith provide said plurality of sampling control signals.

8. The apparatus of claim 7, wherein said signal slicer comprises a plurality of signal comparison circuits configured to compare differences between said individual ones of said portion of said plurality of data sample signals to said equalized data signal and in accordance therewith provide a plurality of comparison result signals as said plurality of data slice signals.

9. The apparatus of claim 7, wherein said sampler controller comprises a plurality of clocked state machines configured to clock in said first and second data slice signals and in accordance therewith provide a plurality of timing signals as said plurality of sampling control signals.

10. The apparatus of claim 7, still further comprising a signal selector, coupled to said signal slicer, configured to receive a selector control signal and in accordance therewith receive and select among said plurality of data slice signals and in accordance therewith provide an output data signal which corresponds to said input data signal.

11. The apparatus of claim 7, wherein:
said input and equalized data signals include a data signal baseline associated therewith;
said plurality of data sample signals still further includes a data sample feedback signal representing a summation of a weighted average of a plurality of positive amplitude peaks of said equalized data signal and a weighted average of a plurality of negative amplitude peaks of said equalized data signal; and
said apparatus still further comprises a baseline corrector, coupled between said signal sampler and said adaptive signal equalizer, configured to receive and process said data sample feedback signal and in accordance therewith establish and maintain said data signal baseline.

12. The apparatus of claim 1, wherein:
said input and equalized data signals include a data signal baseline associated therewith;
said plurality of data sample signals still further includes a data sample feedback signal representing a summation of a weighted average of a plurality of positive amplitude peaks of said equalized data signal and a weighted average of a plurality of negative amplitude peaks of said equalized data signal; and
said apparatus further comprises a baseline corrector, coupled between said signal sampler and said adaptive signal equalizer, configured to receive and process said data sample feedback signal and in accordance therewith establish and maintain said data signal baseline.

13. An apparatus including a high speed data receiver comprising:
a signal sampler configured to receive a plurality of sampling control signals and in accordance therewith receive and sample an input data signal and in accordance therewith provide at least one of a plurality of data sample signals, wherein said plurality of data sample signals includes a first data sample signal which represents a weighted average of a plurality of positive amplitude peaks of said input data signal and further includes a second data sample signal which represents a weighted average of a plurality of negative amplitude peaks of said input data signal;
a signal slicer, coupled to said signal sampler, configured to receive said input data signal and in accordance therewith receive and slice said at least one of a plurality of data sample signals and in accordance therewith provide at least one of a plurality of data slice signals, wherein said plurality of data slice signals includes a first data slice signal which corresponds to a first weighted difference between said first and second data sample signals and further includes a second data slice signal which corresponds to a second weighted difference between said first and second data sample signals; and
a sampler controller, coupled to said signal slicer and said signal sampler, configured to receive and process said at least one of a plurality of data slice signals and in accordance therewith provide said plurality of sampling control signals.

14. The apparatus of claim 13, wherein said signal sampler comprises:
a plurality of signal peak trackers configured to receive said plurality of sampling control signals and said input data signal and in accordance therewith provide a plurality of peak sample signals, wherein each one of said plurality of peak sample signals represents an amplitude peak of said input data signal during a time interval defined by a corresponding one of said plurality of sampling control signals; and
a plurality of signal combiners, coupled to said plurality of signal peak trackers, configured to receive and selectively multiply and sum said plurality of peak sample signals and in accordance therewith provide said at least one of said plurality of data sample signals.

15. The apparatus of claim 13, wherein:
said at least one of a plurality of data sample signals comprises said first and second data sample signals; and
said signal slicer comprises a plurality of signal comparison circuits configured to compare differences between said first and second data sample signals to said equalized data signal and in accordance therewith provide a plurality of comparison result signals as said at least one of a plurality of data slice signals.

16. The apparatus of claim 13, wherein said sampler controller comprises at least one clocked state machine configured to clock in said at least one of a plurality of data slice signals and in accordance therewith provide a plurality of timing signals as said plurality of sampling control signals.

17. The apparatus of claim 13, wherein:
said at least one of a plurality of data slice signals comprises more than one data slice signal; and
said apparatus further comprises a signal selector, coupled to said signal slicer, configured to receive a selector control signal and in accordance therewith receive and select among said more than one data slice signal and in accordance therewith provide an output data signal which corresponds to said input data signal.

18. The apparatus of claim 13, wherein:
said input data signal includes a data signal baseline associated therewith;
said plurality of data sample signals still further includes a data sample feedback signal representing a summation of a weighted average of a plurality of positive amplitude peaks of said input data signal and a weighted average of a plurality of negative amplitude peaks of said input data signal; and
said apparatus still further comprises a baseline corrector, coupled across said signal sampler, configured to receive and process said data sample feedback signal and in accordance therewith establish and maintain said data signal baseline.

19. An apparatus including a high speed data receiver comprising:
a baseline corrector configured to receive a data sample feedback signal and an input data signal having a data signal baseline associated therewith and in accordance therewith establish and maintain said data signal baseline; and
a signal sampler, coupled to said baseline corrector, configured to receive a plurality of sampling control signals and in accordance therewith receive and sample said input data signal with said established and maintained data signal baseline and in accordance therewith provide said data sample feedback signal, wherein said data sample feedback signal represents a summation of a weighted average of a plurality of positive amplitude peaks of said data signal and a weighted average of a plurality of negative amplitude peaks of said data signal.

20. The apparatus of claim 19, wherein said baseline corrector comprises:
a first signal summer configured to receive and sum said data sample feedback signal and a baseline reference signal and in accordance therewith provide a baseline correction signal;
a filter, coupled to said first signal summer, configured to filter said baseline correction signal; and
a second signal summer, coupled to said filter, configured to receive and sum said filtered baseline correction signal and said input data signal and in accordance therewith provide said input data signal with said established and maintained data signal baseline.

21. The apparatus of claim 19, wherein said signal sampler comprises:
a plurality of signal peak trackers configured to receive said plurality of sampling control signals and said baseline corrected input data signal and in accordance therewith provide a plurality of peak sample signals, wherein each one of said plurality of peak sample signals represents an amplitude peak of said baseline corrected input data signal during a time interval defined by a corresponding one of said plurality of sampling control signals; and
a plurality of signal combiners, coupled to said plurality of signal peak trackers, configured to receive and selectively multiply and sum said plurality of peak sample signals and in accordance therewith provide said data sample feedback signal.

22. The apparatus of claim 19, wherein said signal sampler is further configured to receive an equalizer control signal and in accordance therewith adaptively equalize said input data signal.

23. A method of receiving high speed data, said method comprising the steps of:
receiving an equalizer control signal and in accordance therewith receiving and adaptively equalizing an input data signal from a cable and in accordance therewith generating an equalized data signal which corresponds to said input data signal;
receiving a plurality of sampling control signals and in accordance therewith sampling said equalized data signal and in accordance therewith generating at least one of a plurality of data sample signals, wherein said plurality of data sample signals includes a first data sample signal which represents a peak-to-peak amplitude of said equalized data signal and further includes a second data sample signal which represents a magnitude versus time characteristic of said equalized data signal; and
processing said at least one of a plurality of data sample signals and in accordance therewith generating said equalizer control signal.

24. The method of claim 23, wherein said step of receiving a plurality of sampling control signals and in accordance therewith sampling said equalized data signal and in accordance therewith generating a plurality of data sample signals comprises:

receiving said plurality of sampling control signals and said equalized data signal and in accordance therewith generating a plurality of peak sample signals, wherein each one of said plurality of peak sample signals represents an amplitude peak of said equalized data signal during a time interval defined by a corresponding one of said plurality of sampling control signals; and selectively multiplying and summing said plurality of peak sample signals and in accordance therewith generating said at least one of a plurality of data sample signals.

25. The method of claim 23, wherein said step of processing said at least one of a plurality of data sample signals and in accordance therewith generating said equalizer control signal comprises:

processing said plurality of data sample signals;

comparing said first data sample signal and a plurality of comparison reference signals and in accordance therewith generating a comparison result signal which indicates whether said first data sample signal has an amplitude which is greater than one of said plurality of comparison reference signals and less than another one of said plurality of comparison reference signals; and receiving said comparison result signal and in accordance therewith selecting between and processing said first and second data sample signals and in accordance therewith generating said equalizer control signal.

26. The method of claim 23, further comprising the steps of:

receiving said equalized data signal and in accordance therewith slicing a portion of said plurality of data sample signals and in accordance therewith generating a plurality of data slice signals which includes a first data slice signal corresponding to a first weighted difference between individual ones of said portion of said plurality of data sample signals and further includes a second data slice signal corresponding to a second weighted difference between said individual ones of said portion of said plurality of data sample signals; and receiving and processing said first and second data slice signals and in accordance therewith generating said plurality of sampling control signals.

27. The method of claim 26, wherein:

said input and equalized data signals include a data signal baseline associated therewith;

said plurality of data sample signals still further includes a data sample feedback signal representing a summation of a weighted average of a plurality of positive amplitude peaks of said equalized data signal and a weighted average of a plurality of negative amplitude peaks of said equalized data signal; and still further comprising the step of receiving and processing said data sample feedback signal and in accordance therewith establishing and maintaining said data signal baseline.

28. The method of claim 23, wherein:

said input and equalized data signals include a data signal baseline associated therewith;

said plurality of data sample signals still further includes a data sample feedback signal representing a summation of a weighted average of a plurality of positive amplitude peaks of said equalized data signal and a weighted average of a plurality of negative amplitude peaks of said equalized data signal; and further comprising the step of receiving and processing said data sample feedback signal and in accordance therewith establishing and maintaining said data signal baseline.

29. A method of receiving high speed data, said method comprising the steps of:

receiving an input data signal;

receiving a plurality of sampling control signals and in accordance therewith sampling said input data signal and in accordance therewith generating at least one of a plurality of data sample signals, wherein said plurality of data sample signals includes a first data sample signal which represents a weighted average of a plurality of positive amplitude peaks of said input data signal and further includes a second data sample signal which represents a weighted average of a plurality of negative amplitude peaks of said input data signal;

slicing said at least one of a plurality of data sample signals in accordance with said input data signal and in accordance therewith generating at least one of a plurality of data slice signals, wherein said plurality of data slice signals includes a first data slice signal which corresponds to a first weighted difference between said first and second data sample signals and further includes a second data slice signal which corresponds to a second weighted difference between said first and second data sample signals; and processing said at least one of a plurality of data slice signals and in accordance therewith generating said plurality of sampling control signals.

30. The method of claim 29, wherein said step of receiving a plurality of sampling control signals and in accordance therewith sampling said input data signal and in accordance therewith generating a plurality of data sample signals comprises:

receiving said plurality of sampling control signals and said input data signal and in accordance therewith generating a plurality of peak sample signals, wherein each one of said plurality of peak sample signals represents an amplitude peak of said input data signal during a time interval defined by a corresponding one of said plurality of sampling control signals; and selectively multiplying and summing said plurality of peak sample signals and in accordance therewith generating said at least one of said plurality of data sample signals.

31. The method of claim 29, wherein:

said at least one of a plurality of data sample signals comprises said first and second data sample signals; and said step of slicing said at least one of a plurality of data sample signals in accordance with said input data signal and in accordance therewith generating at least one of a plurality of data slice signals comprises comparing differences between said first and second data sample signals to said equalized data signal and in accordance therewith generating a plurality of comparison result signals as said at least one of a plurality of data slice signals.

32. The method of claim 29, wherein said step of processing said at least one of a plurality of data slice signals and in accordance therewith generating said plurality of sampling control signals comprises clocking said at least one of a plurality of data slice signals in at least one clocked state machine and in accordance therewith generating a plurality of timing signals as said plurality of sampling control signals.

33. The method of claim 29, wherein:

said input data signal includes a data signal baseline associated therewith;

said plurality of data sample signals still further includes a data sample feedback signal representing a summation of a weighted average of a plurality of positive amplitude peaks of said input data signal and a weighted average of a plurality of negative amplitude peaks of said input data signal; and further comprising the step of receiving and processing said data sample feedback signal and in accordance therewith establishing and maintaining said data signal baseline.

34. A method of receiving high speed data, said method comprising the steps of:

receiving a data sample feedback signal and an input data signal having a data signal baseline associated therewith and in accordance therewith establishing and maintaining said data signal baseline; and receiving a plurality of sampling control signals and in accordance therewith sampling said input data signal with said established and maintained data signal baseline and in accordance therewith generating said data sample feedback signal, wherein said data sample feedback signal represents a summation of a weighted average of a plurality of positive amplitude peaks of said data signal and a weighted average of a plurality of negative amplitude peaks of said data signal.

35. The method of claim 34, wherein said step of receiving a data sample feedback signal and an input data signal having a data signal baseline associated therewith and in accordance therewith establishing and maintaining said data signal baseline comprises:

receiving and summing said data sample feedback signal and a baseline reference signal and in accordance therewith generating a baseline correction signal;

filtering said baseline correction signal; and summing said filtered baseline correction signal and said input data signal and in accordance therewith generating said input data signal with said established and maintained data signal baseline.

36. The method of claim 34, wherein said step of receiving a plurality of sampling control signals and in accordance therewith sampling said input data signal with said established and maintained data signal baseline and in accordance therewith generating said data sample feedback signal comprises:

receiving said plurality of sampling control signals and said baseline corrected input data signal and in accordance therewith generating a plurality of peak sample signals, wherein each one of said plurality of peak sample signals represents an amplitude peak of said baseline corrected input data signal during a time interval defined by a corresponding one of said plurality of sampling control signals; and selectively multiplying and summing said plurality of peak sample signals and in accordance therewith generating said data sample feedback signal.

\* \* \* \* \*